(12) United States Patent
Low (10) Patent No.: US 12,386,619 B2
(45) Date of Patent: Aug. 12, 2025

(54) STOCHASTIC COMPILATION OF MULTIPLEXED QUANTUM ROTATIONS

(71) Applicant: Microsoft Technology Licensing, LLC, Redmond, WA (US)

(72) Inventor: Guang Hao Low, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1043 days.

(21) Appl. No.: 17/444,548

(22) Filed: Aug. 5, 2021

(65) Prior Publication Data

US 2023/0112724 A1    Apr. 13, 2023

(51) Int. Cl.
*G06N 10/00* (2022.01)
*G06F 9/30* (2018.01)

(52) U.S. Cl.
CPC ...... *G06F 9/30123* (2013.01); *G06F 9/30036* (2013.01); *G06N 10/00* (2019.01)

(58) Field of Classification Search
CPC .. G06N 10/00; G06F 9/30036; G06F 9/30123
See application file for complete search history.

(56) References Cited

U.S. PATENT DOCUMENTS

| | | | | |
|---|---|---|---|---|
| 10,496,933 | B1 * | 12/2019 | Karzig | G06N 10/20 |
| 2023/0016119 | A1 * | 1/2023 | Wei | G06N 10/60 |

OTHER PUBLICATIONS

Burg, et al., "Quantum computing enhanced computational catalysis", In Repository of arXiv:2007.14460v1, Jul. 28, 2020, 104 Pages.

Campbell, Earl, "Shorter Gate Sequences for Quantum Computing by Mixing Unitaries", In Journal of Physical Review A, vol. 95, Issue 4, Apr. 5, 2017, 8 Pages.

Chen, et al., "Quantum simulation via randomized product formulas: Low gate complexity with accuracy guarantees", In Repository of arXiv:2008.11751v1, Aug. 26, 2020, 25 Pages.

Childs, Andrew M. , "On the Relationship Between Continuous- and Discrete-Time Quantum Walk", In the Journal Of Communications in Mathematical Physics, vol. 294, Issue 2, Mar. 1, 2010, 22 Pages.

Childs, et al., "Toward the first quantum simulation with quantum speedup", In Proceedings of the National Academy of Sciences, vol. 115, Issue 38, Sep. 18, 2018, pp. 9456-9461.

Gidney, Craig, "Halving the Cost of Quantum Addition", In Journal of Quantum, vol. 2, Jun. 14, 2018, 6 Pages.

Lee, et al., "Even more efficient quantum computations of chemistry through tensor hypercontraction", In Repository of arXiv:2011.03494v1, Nov. 6, 2020, 68 Pages.

Low, et al., "Hamiltonian Simulation by Qubitization", In Journal of Quantum, vol. 3, Jul. 11, 2019, 12 Pages.

Low, et al., "Trading T-gates for Dirty Qubits in State Preparation and Unitary Synthesis", In repository of arXiv, arXiv:1812.00954v1, Dec. 3, 2018, 11 Pages.

(Continued)

*Primary Examiner* — Barbara M Level
(74) *Attorney, Agent, or Firm* — Alleman Hall & Tuttle LLP (57) ABSTRACT

A quantum-computation method comprises (a) sampling a random bit string from a predetermined distribution of bit strings, where each bit of the random bit string enables or disables a corresponding fixed-angle rotation of a state vector and where the product of the enabled fixed-angle rotations approximates an arbitrary rotation of the state vector through an angle of a multiplexed-rotation gate; and (b) enacting on the state vector each of the fixed-angle rotations enabled by a corresponding bit of the bit string.

14 Claims, 4 Drawing Sheets

(56) References Cited

OTHER PUBLICATIONS

Shende, et al., "Synthesis of Quantum-Logic Circuits", In Journal of IEEE Transactions on Computer-Aided Design of Integrated Circuits and Systems, vol. 25, Issue 6, May 8, 2006, pp. 1000-1010.
Kliuchnikov, et al., "Fast and Efficient Exact Synthesis of Single-Qubit Unitaries Generated by Clifford and T Gates", In Journal of Quantum Information and Computation, vol. 13, Issue 7,8, Jul. 2013, 23 Pages.
"International Search Report and Written Opinion Issued in PCT Application No. PCT/US22/034779", Mailing Date: Sep. 22, 2023, 10 Pages.
Chen, et al., "Concentration for Random Product Formulas", In Repository of arXiv:2008.11751v3, Jul. 2, 2021, 27 Pages.

\* cited by examiner

STOCHASTIC COMPILATION OF MULTIPLEXED QUANTUM ROTATIONS

BACKGROUND

A quantum computer is a physical machine configured to execute logical operations based on or influenced by quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, integer factorization, data searching, and function optimization as applied to systems of linear equations and machine learning. Moreover, it has been predicted that continued miniaturization of conventional computer logic structures will ultimately lead to the development of nanoscale logic components that exhibit quantum effects, and must therefore be addressed according to quantum-computing principles.

SUMMARY

One aspect of this disclosure is directed to a quantum-computation method for physically transforming a state register of a quantum computer, the state register holding a state vector in a series of qubits. The method comprises (a) sampling a random bit string from a predetermined distribution of bit strings, where each bit of the random bit string enables or disables a corresponding fixed-angle rotation of the state vector and where the product of the enabled fixed-angle rotations approximates an arbitrary rotation of the state vector through an angle of a multiplexed-rotation gate; and (b) enacting on the state vector each of the fixed-angle rotations enabled by a corresponding bit of the bit string.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

1. Quantum-Computer Architecture

Figure 1:
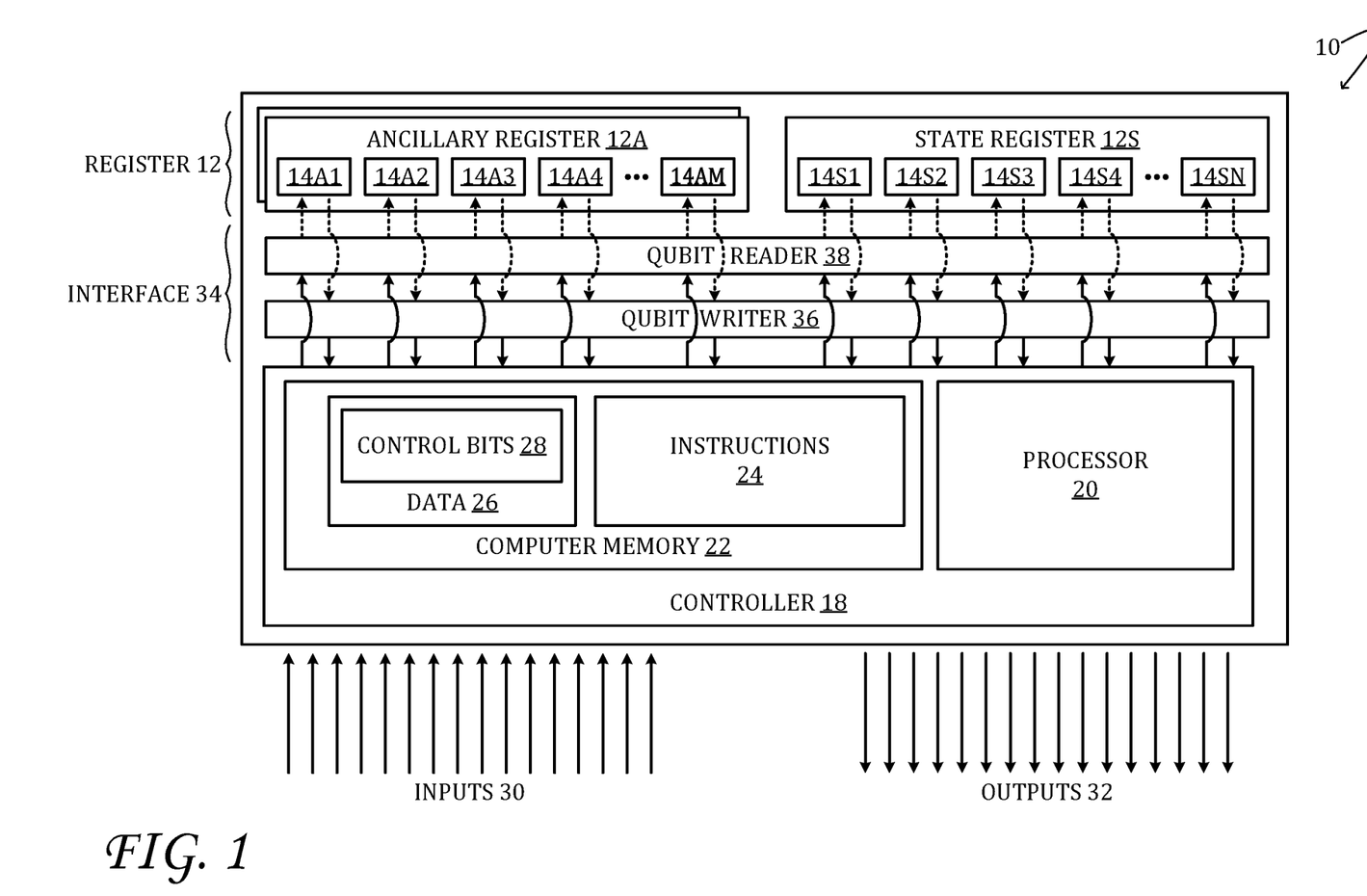
FIG. 1 shows aspects of an example quantum computer.

In order to provide a context for quantum computing, some aspects of an example quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes a set of qubit registers 12—e.g., state register 12S and ancillary register 12A. Each qubit register includes a series of qubits 14. The number of qubits in a qubit register is not particularly limited but may be determined based on the complexity of the quantum logic to be enacted by the quantum computer.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. A qubit may be implemented in the plural processing states corresponding to different modes of light propagation through linear optical elements (e.g., mirrors, beam splitters and phase shifters), as well as in states accumulated within a Bose-Einstein condensate. More generally, each qubit 14 may comprise any particle or system of particles that can exist in two or more discrete quantum states that can be measured and manipulated experimentally.

Figure 2:
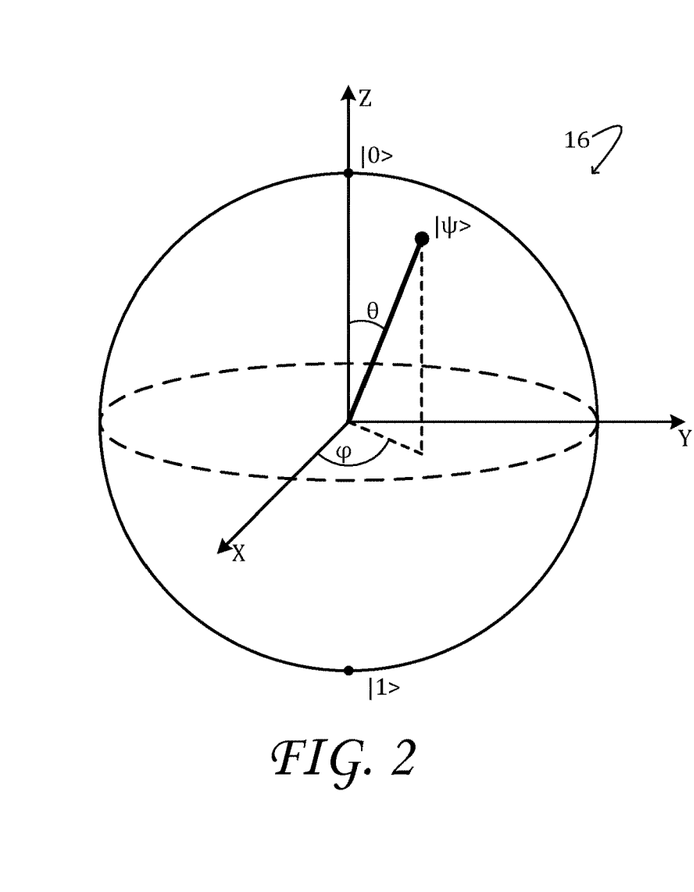
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$, respectively up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. Processor 20 may be coupled operatively to peripheral componentry, such as network componentry, to enable the quantum computer to be operated remotely. Processor 20 may take the form of a central processing unit (CPU), a graphics processing unit (GPU), or the like. As such, controller 18 may comprise classical electronic componentry. The terms 'classical' and 'non-quantum' are applied herein to any component that can be modeled accurately without considering the quantum state of any individual particle therein. Classical electronic components include integrated, microlithographed transistors, resistors, and capacitors, for example. Computer memory 22 may be configured to hold program instructions 24 that cause processor 20 to execute any function or process of controller 18. The computer memory may also be configured to hold additional data 26. In some examples, data 26 may include a register of classical control bits 28 that influence the operation of the quantum computer during run time—e.g., to provide classical control input to one or more quantum-gate operations. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 30 and to provide a plurality of outputs 32. The inputs and outputs may each comprise digital and/or analog lines. At least some of the inputs and outputs may be data lines through which data is provided to and/or extracted from the quantum computer. Other inputs may comprise control lines via which the operation of the quantum computer may be adjusted or otherwise controlled.

Controller 18 is operatively coupled to qubit registers 12 via quantum interface 34. The quantum interface is configured to exchange data (solid lines) bidirectionally with the controller. The quantum interface is further configured to exchange signal associated with the data (dashed lines) bidirectionally with the qubit registers. Depending on the physical implementation of qubits 14, such signal may include electrical, magnetic, and/or optical signal. Via signal conveyed through the quantum interface, the controller may interrogate and otherwise influence the quantum state held in any, some, or all of the qubit registers, as defined by the collective quantum state of the qubits therein. To that end, the quantum interface includes qubit writer 36 and qubit reader 38. The qubit writer is configured to output a signal to one or more qubits of a qubit register based on write-data received from the controller. The qubit reader is configured to sense a signal from one or more qubits of a qubit register and to output read-data to the controller based on the signal. The read-data received from the qubit reader may, in some examples, be an estimate of an observable to the measurement of the quantum state held in a qubit register. Taken together, controller 18 and interface 34 may be referred to as a 'controller system'.

In some examples, suitably configured signal from qubit writer 36 may interact physically with one or more qubits 14 of a qubit register 12, to trigger measurement of the quantum state held in the one or more qubits. qubit reader 38 may then sense a resulting signal released by the one or more qubits pursuant to the measurement, and may furnish read-data corresponding to the resulting signal to controller 18. Stated another way, the qubit reader may be configured to output, based on the signal received, an estimate of one or more observables reflecting the quantum state of one or more qubits of a qubit register, and to furnish the estimate to controller 18. In one non-limiting example, the qubit writer may provide, based on data from the controller, an appropriate voltage pulse or pulse train to an electrode of one or more qubits, to initiate a measurement. In short order, the qubit reader may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 34 may be configured to implement one or more quantum-logic gates to operate on the quantum state held in a qubit register 12. The term 'state vector' refers herein to the quantum state held in the series of qubits 14S of state register 12S of quantum computer 10. Whereas the function of each type of logic gate of a classical computer system is described according to a corresponding truth table, the function of each type of quantum gate is described by a corresponding operator matrix. The operator matrix operates on (i.e., multiplies) the complex vector representing a qubit register state and effects a specified rotation of that vector in Hilbert space.

For example, the Hadamard gate H is defined by $$H = \frac{1}{\sqrt{2}} \begin{bmatrix} 1 & 1 \\ 1 & -1 \end{bmatrix}. \tag{1}$$

The H gate acts on a single qubit; it maps the basis state $|0\rangle$ to $(|0\rangle+|1\rangle)/\sqrt{2}$, and maps $|1\rangle$ to $(|0\rangle-|1\rangle)/\sqrt{2}$. Accordingly, the H gate creates a superposition of states that, when measured, have equal probability of revealing $|0\rangle$ or $|1\rangle$.

The phase gate S is defined by $$S = \begin{bmatrix} 1 & 0 \\ 0 & e^{i\pi/2} \end{bmatrix}. \tag{2}$$

The S gate leaves the basis state $|0\rangle$ unchanged but maps $|1\rangle$ to $e^{i\pi/2}|1\rangle$. Accordingly, the probability of measuring either $|0\rangle$ or $|1\rangle$ is unchanged by this gate, but the phase of the quantum state of the qubit is shifted. This is equivalent to rotating p by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1 & 0 & 0 & 0 \\ 0 & 0 & 1 & 0 \\ 0 & 1 & 0 & 0 \\ 0 & 0 & 0 & 1 \end{bmatrix}. \tag{3}$$

A 'Clifford gate' is a quantum gate that belongs to the Clifford group—viz., a set of quantum gates that effect permutations of the Pauli operators. For the n-qubit case the Pauli operators form a group $$P_n = \{e^{i\theta\pi/2}\sigma_{j_1} \otimes \ldots \otimes \sigma_{j_n} | \theta=0,1,2,3, j_k=0,1,2,3\}, \tag{4}$$

where $\sigma_0, \ldots \sigma_3$ are the single-qubit Pauli matrices. The Clifford group is then defined as the group of unitaries that normalize the Pauli group, $$C_n = \{V \in U_{2^n} | V P_n V^\dagger = P_n\}. \tag{5}$$

The foregoing list of quantum gates and associated operator matrices is nonexhaustive, but is provided for ease of illustration. Other quantum gates include Pauli-X, -Y, and -Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
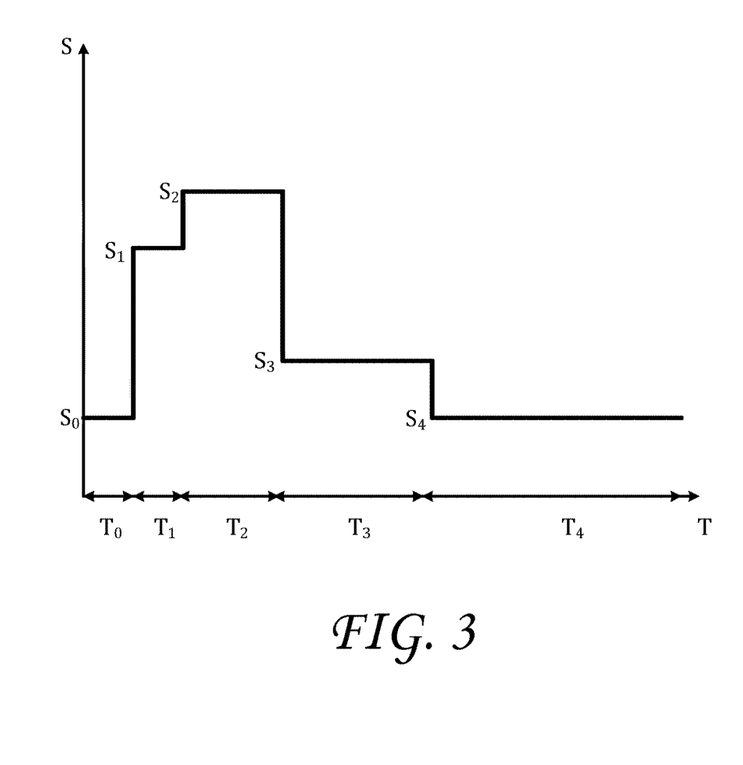
FIG. 3 shows aspects of an example signal waveform for effecting a quantum-gate operation in a quantum computer.

Continuing in FIG. 1, suitably configured signal from qubit writer 36 of quantum interface 34 may interact physically with one or more qubits 14 of a qubit register 12 so as to assert any desired quantum-gate operation. As noted above, the desired quantum-gate operations include specifically defined rotations of a complex vector representing a qubit register state. In some examples, in order to effect a desired rotation O, the qubit writer may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of a qubit register. In general, each signal level $S_i$ and each duration $T_i$ is a control parameter adjustable by appropriate programming of controller 18.

The terms 'oracle' and 'quantum algorithm' are used herein to describe a predetermined sequence of elementary quantum-gate and/or measurement operations executable by quantum computer 10. An oracle may be used to transform the quantum state of a qubit register 12 to effect a classical or non-elementary quantum-gate operation or to apply a density operator, for example. In some examples, an oracle may be used to enact a predefined 'black-box' operation $f(x)$, which may be incorporated iton a complex sequence of operations. To ensure adjoint operation, an oracle mapping n input qubits $x\rangle$ to m output or ancilla qubits $|y=f(x)\rangle$ may be defined as a quantum gate $O(|x\rangle \otimes |y\rangle)$ operating on the (n+m) qubits. In this case, O may be configured to pass the n input qubits unchanged but combine the result of the operation $f(x)$ with the ancillary qubits via an XOR operation, such that $O(|x\rangle \otimes |y\rangle) = |x\rangle \otimes |y \otimes f(x)\rangle$.

Implicit in the description herein is that each qubit 14 of any qubit register 12 may be interrogated via quantum interface 34 so as to reveal with confidence the standard basis vector $|0\rangle$ or $|1\rangle$ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting oracle that reveals the quantum state of the logical qubit with above-threshold confidence.

2. Overview of Multiplexed Quantum Rotations

Multiplexed-rotation gates are important quantum-circuit elements in many quantum algorithms. Although a multiplexed-rotation gate can be compiled into primitive fault-tolerant quantum gates, the known methods that minimize the required number of expensive non-Clifford gates have large quantum-memory requirements. Presented here is a method that halves the quantum-memory requirement. This method is based on randomizing over a carefully chosen family of approximate multiplexed rotations to realize the ideal rotation on average. This approach uniquely reduces the ancillary-qubit count in a scenario in which the non-Clifford gate count is already optimal.

Compiling quantum algorithms into the smallest number of primitive gates and qubits is key to scalable quantum computing. In fault-tolerant quantum computers, it is expected that the primitive gates are drawn from the universal gate-set {H, S, C$_{NOT}$, T} of Hadamard, phase, controlled-NOT, and T respectively. However, quantum algorithms are typically expressed in terms of more complex subroutines, such as arithmetic operations [Ref. 1], table-lookup [Ref. 2], black-box quantum oracles [Ref. 3], and arbitrary single-qubit rotations [Ref. 4]. Effective compilation in many cases reduces to finding effective decompositions of these common subroutines into primitive gates. Moreover, the Clifford gates {H, S, C$_{NOT}$} are expected to be orders of magnitude easier to realize than the non-Clifford T gate. Hence it is typically preferable to minimize the number of T gates.

The multiplexed-rotation gate is a subroutine used in many quantum algorithms, such as arbitrary quantum state preparation [Ref. 5] and simulations of electronic structure [Ref. 6], [Ref. 7], [Ref. 8]. This subroutine is a unitary operator defined as $$U = \sum_{k=0}^{K-1} |k\rangle \langle k| \otimes e^{i2\pi\theta_k Z}. \tag{6}$$

In other words, controlled on a binary integer $|k\rangle$ in an ancillary register, apply the single-qubit rotation $e^{i2\pi\theta_k Z}$ on the system register, where $\theta_k \in [0, 1)$. This is extremely general as the K=1 case reduces to just an uncontrolled single-qubit rotation. Building upon U, more complex subroutines are possible, such as various multiplexed-rotation circuits—viz., $$V = \sum_{k=0}^{K-1} |k\rangle \langle k| \otimes \left( \prod_{j=0}^{M-1} V_j \cdot e^{i2\pi\theta_{k,j} Z} \right), \tag{7}$$

where $V_j$ are arbitrary unitary operators. Even though the detailed compilation of V may differ greatly from case to case, its behavior in a quantum circuit may be understood as just a product of different U operators.

Generally speaking, a quantum algorithm may include N applications of some instance of U. For instance the algorithm might be a unitary $$Q = \left( \prod_{j=1}^{N} Q_j \cdot U_j \right) \cdot Q_0, \tag{8}$$

where $Q_j$ are arbitrary unitaries, and the number of controls or rotation angles of each $U_j$ is arbitrary and may differ. However, in compiling into primitive gates, it is generally only possible to form an approximation $\tilde{U}_j$ to $U_j$. For instance, one might bound the error $\|U_j - \tilde{U}_j\| \leq \delta$ in spectral norm. The implemented algorithm $$\tilde{Q} = \left( \prod_{j=1}^{N} Q_j \cdot \tilde{U}_j \right) \cdot Q_0 \tag{9}$$

then has an error $\|Q - \tilde{Q}\|$ that can be bounded by a targeted error $\in$. As follows from a well-known triangle inequality on a telescoping sum, $$\in = \|Q - \tilde{Q}\| \leq N \|U - \tilde{U}\| \leq N\delta. \tag{10}$$

Thus it is sufficient to compile $\tilde{U}_j$ such that $$\|U_j - \tilde{U}_j\| \leq \frac{\epsilon}{N}. \tag{11}$$

Recent work focusing on the case where $U_j$ are single-qubit rotations synthesized from a product of {H, S, T} gates has found that if the compilation of $\tilde{U}_j$ is randomized such its mean approximates the ideal unitary like $\|\mathbb{E}[\tilde{U}_j] - U_j\| \leq \gamma$, then it is possible that the error adds up statistically rather than linearly [Ref. 9]. Roughly speaking, let the quantum channel $\mathcal{Q}(\rho)=Q\rho Q^\dagger$, and let $\tilde{\mathcal{Q}}$ be the quantum channel corresponding to this randomized compilation process. Then the average error of this process is $$\epsilon_o = \frac{1}{2}\|\tilde{\mathcal{Q}} - \mathcal{Q}\|_o \leq N(\delta^2 + 2\gamma), \quad (12)$$

which implies a looser constraint $$\|U_j - \tilde{U}_j\| \leq \sqrt{\frac{\epsilon_o}{N}}. \quad (13)$$

This disclosure investigates randomized compilation with three main differences relative to the recent work. First, it generalizes $U_j$ from single-qubit rotations to the multiplexed rotations. Second, in addition to evaluating the error of the channel representing averaging over many instances of compilation, it evaluates the error of a single instance of compilation, which may be interest. The derivation here disclosed follows related work [Ref. 10]. Third, instead of the {H, S, T} single-qubit compilation, this disclosure focuses on compilation strategy tailored to multiplexed rotation based on control by randomized classical integers stored in qubit registers; the approach herein roughly halves the number of qubits required.

The cost of deterministically compiling $\tilde{U}$ by different methods have different tradeoffs with respect to T gate cost, T gate depth, and qubit count, which also depend on the number of controls K. A few are summarized in the table below.

| K | Operator | # T gates | qubit count | comments |
|---|---|---|---|---|
| 1 | U [Ref. 4] | $\mathcal{O}(\log(N/\epsilon))$ | 1 | — |
| >1 | U [Ref. 11] | $\mathcal{O}(K \log(N/\epsilon))$ | $\mathcal{O}(\log(K))$ | — |
| >1 | U [Ref. 2] | $\mathcal{O}\left(\frac{K}{\lambda} + \sqrt{bK}\right)$ | $\mathcal{O}(\log(K)) + \lambda b$ | $b = \log_2(N\pi/\epsilon)$, $\lambda \geq 1$ |
| >1 | V [Ref. 6] | $\mathcal{O}\left(\frac{K}{\lambda} + \sqrt{bMK}\right)$ | $\mathcal{O}(\log(K)) + \lambda bK$ | $b = \log_2(NK\pi/\epsilon)$, $\lambda \geq 1$ |

The focus here is on the compilation strategy by Low et al. [Ref. 2], [Ref. 6] built from a number of simple subroutines as follows.

Integer-controlled single-qubit rotation $e^{i2\pi\theta Z}$. Let $$\theta^{(b)} = \sum_{l=1}^{b} 2^{-l}\theta_l$$

be a b-bit approximation of $\theta$. The state $|\theta^{(b)}\rangle = \otimes_{l=1}^{b}|\theta_l\rangle$. Now define a unitary subroutine R that maps $R|\theta^{(b)}\rangle|\psi\rangle = |\theta^{(b)}\rangle e^{i2\pi\theta^{(b)}Z}|\psi\rangle$. This may be implemented by a variety of techniques. For example, controlled by the qubit $|\theta_l\rangle$, apply the rotation $e^{i2^{l+1}\pi\theta_l Z}$ on the system qubit. Thus the rotations induced by $|\theta^{(b)}\rangle$ add up to form $e^{i2\pi\theta^{(b)}Z}$. Another more efficient method based on the phase gradient technique [Ref. 1] achieves the same effect with fewer T gates. For present purposes, what matters is the number of bits b needed to approximate $e^{i2\pi\theta Z}$. A simple evaluation reveals that $$\epsilon = \|e^{i2\pi\theta Z} - e^{i2\pi\theta^{(b)}Z}\| = |2\sin(\pi(\theta - \theta^{(b)}))| \leq 2\pi(\theta - \theta^{(b)}) \leq \frac{\pi}{2^b}. \quad (14)$$

Hence the number of bits $$b = \log_2\left(\frac{\pi}{\epsilon}\right).$$

(K,b)-table-lookup oracle [Ref. 2] subroutine. This is a unitary operator $D|k\rangle|0\rangle^{\otimes b} = |k\rangle|x_k\rangle$. Controlled on an integer $k \in [K]$, table lookup returns the bitstring $x_k$.

Implementation of U. Apply (K,b)-table-lookup that outputs the bitstrings $\theta_k^{(b)}$. Now apply the value-controlled rotation R, and uncompute table-lookup to erase the bitstring $\theta_j^{(b)}$. This may be seen to implement U as follows:

$$|k\rangle \xrightarrow{D} |k\rangle\left|\theta_k^{(b)}\right\rangle \xrightarrow{R} |k\rangle\left|\theta_k^{(b)}\right\rangle \otimes e^{i2\pi\theta_k^{(b)}Z} \xrightarrow{D^\dagger} |k\rangle \otimes e^{i2\pi\theta_k^{(b)}Z}. \quad (15)$$

Implementation of V. Apply (K,bM)-table-lookup that outputs all N bitstrings $\theta_{k,j}^{(b)}$. For $j=0, \ldots, M-1$, apply R controlled by the bitstring $|\theta_{k,j}^{(b)}\rangle$ and then $V_j$. This may be seen to implement U as follows:

$$|k\rangle \xrightarrow{D} |k\rangle\left|\theta_{k,0}^{(b)}\right\rangle \ldots \left|\theta_{k,M-1}^{(b)}\right\rangle \quad (16)$$

$$\xrightarrow{R} |k\rangle\left|\theta_{k,0}^{(b)}\right\rangle \ldots \left|\theta_{k,M-1}^{(b)}\right\rangle \otimes e^{i2\pi\theta_{k,0}^{(b)}Z} \quad (17)$$

$$\xrightarrow{V_0} |k\rangle\left|\theta_{k,0}^{(b)}\right\rangle \ldots \left|\theta_{k,M-1}^{(b)}\right\rangle \otimes \left(V_0 \cdot e^{i2\pi\theta_{k,0}^{(b)}Z}\right) \quad (18)$$

$$\vdots \quad (19)$$

$$\xrightarrow{V_{N-1}} |k\rangle\left|\theta_{k,0}^{(b)}\right\rangle \ldots \left|\theta_{k,M-1}^{(b)}\right\rangle \otimes \left(\prod_{j=0}^{M-1} V_j \cdot e^{i2\pi\theta_{k,j}^{(b)}Z}\right) \quad (20)$$

$$\xrightarrow{D^\dagger} |k\rangle \otimes \left(\prod_{j=0}^{M-1} V_j \cdot e^{i2\pi\theta_{k,j}^{(b)}Z}\right). \quad (21)$$

An important result is to show how to choose the rotation bits $\theta^{(b)}$ to achieve an error quadratically smaller than the error obtained by the triangle inequality. This provides the new result of reducing the dominant qubit overhead b by roughly a factor of two. The method relies on choosing each bitstring $\theta_{k,j}^{(b)} \sim \Theta_{k,j}^{(b)}$ to be randomly sampled from a carefully chosen distribution $\Theta_{k,j}^{(b)}$.

This is the approximation strategy: for any rotation angle $$\theta = \sum_{l=1}^{\infty} \theta_l 2^{-l},$$

the angle is approximated by a random b-bit fraction $\Theta^{(b)}$, which is a random variable $\Theta^{(b)} = \theta^{(b)} + 2^{-b}X^{(b)}$, where $$\theta^{(b)} = \sum_{l=1}^{b-1} \theta_l 2^{-l},$$

$X^{(b)} \sim$ Bernoulli $(r^{(b)})$, and $r^{(b)} = 2^b(\theta - \theta^{(b)})$. Observe that $\mathbb{E}[\Theta^{(b)}] = \theta$.

In contrast, the prior approach has been to fix all $\theta_{k,j}^{(b)}$ as identical. Hence each table-lookup oracle D and thus $\tilde{U}_j$ is random. The overall random quantum circuit, $$\tilde{Q} = \left(\prod_{j=1}^{N} Q_j \cdot -\tilde{U}_j\right) \cdot Q_0, \quad (22)$$

is thus a random unitary. This disclosure provides a variety of error bounds on how well $\tilde{Q}$ approximates $Q$. In the diamond distance between the unitary channel $\mathcal{Q}$ and the average $\bar{\mathcal{Q}}$ of $\tilde{\mathcal{Q}}$, we show that $$\frac{1}{2}\|\mathcal{Q} - \mathbb{E}[\tilde{\mathcal{Q}}]\|_\diamond \leq \frac{\pi^2}{2}\frac{N}{2^{2b}}, \quad (23)$$

This disclosure shows that that the error of a random instance $\|\tilde{Q}-Q\|$ is small with high probability. In other words, $$\max_{|\psi\rangle} \mathbb{E}[\|(\tilde{Q}-Q)|\psi\rangle\|] \leq 4\pi \frac{\sqrt{N}}{2^b}. \quad (24)$$

Note that the dependence on $2^b$ is quadratically worse than the quantum channel analysis. In more detail, this disclosure establishes tail bounds on the error distribution $$\max_{|\psi\rangle} Pr[\|(\tilde{Q}-Q)|\psi\rangle\| \geq \epsilon] \leq \exp\left(-\frac{\epsilon^2 2^{2b}}{32e\pi^2 N}\right). \quad (25)$$

There are a few straightforward generalizations of these results. The description above was focused on the case where the bit-string $\theta^{(b)}$ parameterized the applied unitary, which was specifically a rotation—e.g., $R_F|\theta^{(b)}\rangle|\psi\rangle = |\theta^{(b)}\rangle e^{i2\pi\theta^{(b)}Z}|\psi\rangle$. However, this may be generalized to any unitary function $F(\theta^{(b)})$ that approximates the infinite-bit limit $F(\theta)$—e.g., $$R_F|\theta^{(b)}\rangle|\psi\rangle = |\theta^{(b)}\rangle F(\theta^{(b)})|\psi\rangle, \quad (26)$$

and may decrease the number of bits needed for its specification.

The following description first introduces the formalism for bounding the error of instances of randomized quantum circuits. Second, it describes the distribution $\Theta_{k,j}^{(b)}$ for randomized compilation of multiplexed rotations. Third, it proves statements related to the error bounds. Finally, it presents example applications highlighting the potential improvement over deterministic compilation schemes.

3. Error Bounds

The diamond distance between two quantum channels bounds the maximum difference between the probabilities of any possible measurement outcome on any possible input state. Given any quantum channel $\mathcal{Q}$ and $\bar{\mathcal{Q}}$, it is defined as $$\frac{1}{2}\|\mathcal{Q}-\bar{\mathcal{Q}}\|_\diamond = \frac{1}{2}\max_{\|\rho\|_1=1}\|(\mathcal{Q}\otimes\mathcal{I})[\rho] - (\bar{\mathcal{Q}}\otimes\mathcal{I})[\rho]\|_1 \quad (27)$$

where the dimension of $\mathcal{I}$ is the same as $\mathcal{Q}$. Though difficult to compute in general, the diamond distance is related to other more easily computable distances for our applications. In particular, when $\mathcal{Q}[\rho]=Q^\dagger\rho Q$ is a unitary channel and $\bar{\mathcal{Q}}[\rho]=\mathbb{E}[\tilde{Q}^\dagger\rho\tilde{Q}]$ is an average over random unitary channels [Ref. 10], $$\tfrac{1}{2}\|\mathcal{Q}-\bar{\mathcal{Q}}\|_\diamond \leq \|Q-\mathbb{E}[\tilde{Q}]\|. \quad (28)$$

The error of a given instance of $\tilde{\mathcal{Q}}$ is a random variable $$\|\tilde{Q}-Q\| = \max_{|\psi\rangle}\|(\tilde{Q}-Q)|\psi\rangle\|. \quad (29)$$

One may estimate the average error by bounding $\mathbb{E}[\max_{|\psi\rangle}\|(\tilde{Q}-Q)|\psi\rangle\|]$. This average is too pessimistic, however, as it implies that for any sampled $\tilde{Q}$, the worst $|\psi\rangle$ is chosen. It will be noted that $\tilde{Q}$ is expected to perform well for all possible input states. In practice however, a sampled $\tilde{Q}$ is only applied once to a single input state; future repeats would re-sample $\tilde{Q}$ rather than reuse the original sample. Hence the more relevant measure of error is $$\max_{|\psi\rangle}\mathbb{E}[\|(\tilde{Q}-Q)|\psi\rangle\|]. \quad (30)$$

It is even more informative to bound the probability of large deviations of the error from the mean $$\max_{|\psi\rangle}Pr[\|(\tilde{Q}-Q)|\psi\rangle\| \geq \epsilon]. \quad (31)$$

From Markov's inequality, $$Pr[|X| \geq a] \leq \frac{\mathbb{E}[\varphi(|X|)]}{\varphi(|a|)}$$

for any $a \geq 0$ and monotonically increasing non-negative function $\varphi$ satisfying $\varphi(a)>0$. Choosing $\varphi(x)=x^q$, $$Pr[\|(\tilde{Q}-Q)|\psi\rangle\| \geq \epsilon] \leq \frac{\mathbb{E}[\|(\tilde{Q}-Q)|\psi\rangle\|^q]}{\epsilon^q}. \quad (32)$$

The error is split into a systematic and a random component by adding and subtracting its expectation $$\|(\tilde{Q}-Q)|\psi\rangle\| = \|(\tilde{Q}-\mathbb{E}[\tilde{Q}]+\mathbb{E}[\tilde{Q}]-Q)|\psi\rangle\| \quad (33)$$

$$\leq \|(\mathbb{E}[\tilde{Q}]-Q)|\psi\rangle\| + \|(\tilde{Q}-\mathbb{E}[\tilde{Q}])|\psi\rangle\| \quad (34)$$

$$\leq \underbrace{\|(\mathbb{E}[\tilde{Q}]-Q)\|}_{\text{Systematic}} + \underbrace{\|(\tilde{Q}-\mathbb{E}[\tilde{Q}])|\psi\rangle\|}_{\text{Random}}. \quad (35)$$

Note that the systematic component $\|Q-\mathbb{E}[\tilde{Q}]\|$ also upper bounds the diamond distance. As for the random component, $(x+y)^q \leq 2^q \max\{x^q, y^q\}$ is used for $x, y \geq 0$ to bound $$\mathbb{E}[\|(\tilde{Q}-Q)|\psi\rangle\|^q] \leq 2^q \max\{\|\mathbb{E}[\tilde{Q}]-Q)|\psi\rangle\|^q, \mathbb{E}[\|(\tilde{Q}-\mathbb{E}[\tilde{Q}])|\psi\rangle\|^q]\}. \tag{36}$$

These quantities will now be evaluated.

4. Bounding the Systematic Shift

The error due to the systematic component is $\|(\mathbb{E}[\tilde{Q}]-Q)|\psi\rangle\| \leq \|\mathbb{E}[\tilde{Q}]-Q\|$. This may be bounded by a triangle inequality on a telescoping sum $$\|\mathbb{E}[\tilde{Q}]-Q\| \leq \left\|\left(\prod_{j=1}^{N-1} Q_j \cdot \mathbb{E}[\tilde{U}_j]\right) - \left(\prod_{j=1}^{N-1} Q_j \cdot U\right)\right\| \tag{37}$$

$$\leq N\|\mathbb{E}[\tilde{U}]-U\|. \tag{38}$$

The problem thus reduces to bounding the systematic shift of a single application of $\|\mathbb{E}[\tilde{U}]-U\|$.

Consider first the simple $K=1$ case where $U$ is just a single-qubit rotation $e^{i2\pi\theta_0 Z}$. As stated in the approximation strategy, one may construct the random unitaries $\tilde{Q}$ by replacing $\theta_j$ the b-bit random variable $\Theta_j^{(b)} = \theta_j^{(b)} + 2^{-b} X_j^{(b)}$, where $$\theta_j^{(b)} = \sum_{l=1}^{b-1} \theta_{j,l} 2^{-l},$$

$X_j^{(b)} \sim$ Bernoulli $(r_j^{(b)})$ and $r_j^{(b)} = 2^b(\theta_j - \theta_j^{(b)})$. As the rotation angles are independent, the average $\mathbb{E}[\tilde{Q}]$ is obtained by replacing each rotation $e^{i2\pi\theta_j P_j}$ by its average $\mathbb{E}[e^{i2\pi\theta_j^{(b)} P_j}]$. Thus one may bound $$\|\mathbb{E}[\tilde{U}]-U\| = \left\|e^{i2\pi\theta P} - \mathbb{E}[e^{i2\pi\Theta^{(b)} P}]\right\| \tag{39}$$

$$= \left\|e^{i2\pi(\theta^{(b)}+2^{-b}r^{(b)})P} - \right. \tag{40}$$
$$\left. (1-r^{(b)})e^{i2\pi\theta^{(b)}P} - r^{(b)}e^{i2\pi(\theta^{(b)}+2^{-b})P}\right\|$$

$$= \left\|I - (1-r^{(b)})e^{-i\pi 2^{-b+1} r^{(b)} P} - r^{(b)} e^{i\pi 2^{-b+1}(1-r^{(b)})P}\right\| \tag{41}$$

$$= \left|I - (1-r^{(b)})e^{i2\pi(-r^{(b)})} - r^{(b)} e^{i2\pi(2^{-b}-r^{(b)})}\right| \tag{42}$$

This is maximized when $r^{(b)}=1/2$. Hence.

$$\|E[\tilde{U}]-U\| \leq \left|1 - \frac{e^{-i\pi 2^{-b}} + e^{i\pi 2^{-b}}}{2}\right| = |1-\cos(\pi/2^b)| \leq \frac{\pi^2}{2^{2b+1}}. \tag{43}$$

This implies that the diamond distance $$\frac{1}{2}\|Q-\tilde{Q}\|_\diamond \leq \|\mathbb{E}[\tilde{Q}]-Q\| \leq \frac{\pi^2}{2} \frac{N}{2^{2b}}. \tag{44}$$

Observe that this is at least a squared improvement over the naive application of the triangle inequality to $$\|\tilde{Q}-Q\| \leq N\|\tilde{U}-U\| \leq 2\pi \frac{N}{2^b},$$

where the largest difference between a given instance of a random rotation and its ideal is $$\|\tilde{U}-U\| = \max_{x \in \Theta^{(b)}} \left\|e^{i2\pi\theta P} - e^{i2\pi x P}\right\| \tag{45}$$

$$= \max_{x \in \text{Bernoulli}(r_j^{(b)})} \left\|e^{i2\pi(\theta^{(b)}+2^{-b}r^{(b)})P} - e^{i2\pi(\theta^{(b)}+2^{-b}x)P}\right\| \tag{46}$$

$$= \max_{x \in \text{Bernoulli}(r_j^{(b)})} \left\|1 - e^{i\pi 2^{-b+1}(x-r^{(b)})P}\right\| \tag{47}$$

$$\leq \left|1 - e^{i\pi 2^{-b+1}}\right| = \sqrt{2-2\cos(\pi 2^{-b+1})} \leq \frac{2\pi}{2^b}. \tag{48}$$

In the general $K>1$ case, where $$U = \sum_k |k\rangle\langle k| \otimes e^{i2\pi\theta_k Z},$$

one similarly constructs $\tilde{U}$ and hence $\tilde{Q}$ by approximating $\theta_k$ with $\Theta_k^{(b)}$. Observe that $$\mathbb{E}[\tilde{U}] = \sum_k |k\rangle\langle k| \otimes \mathbb{E}[e^{i2\pi\theta_k Z}].$$

Hence the error $$\|\mathbb{E}[\tilde{U}]-U\| \leq \frac{\pi^2}{2^{2b+1}},$$

which is identical to $K=1$ case, and thus $\|\mathbb{E}[\tilde{Q}]-Q\|$ is unchanged. This result indicates that the average unitary $\mathbb{E}[\tilde{Q}]$ has an smaller error roughly equivalent to a doubling of b.

4.1. Generalization to Arbitrary Controlled Unitaries

The error of the circuit $$V = \sum_{k=0}^{K-1} |k\rangle\langle k| \otimes \left(\prod_{j=0}^{M-1} V_j \cdot e^{i2\pi\theta_{k,j} Z}\right)$$

with rotation angles $\theta_{k,j}$ replaced by its randomization $\theta_{k,j}^{(b)} \sim \theta_{k,j}^{(b)}$ may be analyzed similarly. The action of V is equivalent to M different applications of U. Hence a circuit Q in which U is replaced by V has a systematic error $$\|\mathbb{E}[\tilde{Q}]-Q\| \leq \frac{\pi^2}{2} \frac{NM}{2^{2b}}. \tag{49}$$

The most general setting where $R_F$ implements a general unitary $F(\theta^{(b)})$ instead of a rotation can be analyzed similarly by evaluating $\|\mathbb{E}[F(\Theta^{(b)})]-F(\theta)\|$. This of course depends on the details of F and the chosen distribution $\Theta^{(b)}$. As an example, consider the case where $F(\theta) = e^{2\pi i \theta (XX+YY)}$, which is the product of two commuting rotations with the same angle. The eigenvalues of XX+YY are $\{0, 0, 2, 2\}$. Hence $$\left\| \mathbb{E}[F(\Theta^{(b)})] - F(\theta) \right\| \leq \frac{2\pi^2}{2^{2b}}.$$

5. Bounding the Random Shift

The next result is to bound the component $\mathbb{E}[\|(\tilde{Q} - \mathbb{E}[\tilde{Q}])|\psi\rangle \|^q]$ arising from fluctuations of $\tilde{Q}$ from its mean. The proof is based on exploiting orthogonal vectors in a martingale difference sequence using the fact $$\mathbb{E}[\|x+y\|^q]^{2/q} \leq (\mathbb{E}\|x\|^q)^{2/q} + (q-1)(\mathbb{E}\|y\|^q)^{2/q} \quad (50)$$

for $q \geq 2$ and random vectors x, y that obey $\mathbb{E}[y|x]=0$. Now consider a sequence of random vectors $|\psi_j\rangle = (\Pi_{l=1}^j Q_j \cdot \tilde{U}_j) \cdot Q_0|\psi\rangle$. Then $(\tilde{Q} - \mathbb{E}[\tilde{Q}])|\psi\rangle = |\psi_N\rangle - \mathbb{E}[|\psi_N\rangle]$. By adding $Q_N \mathbb{E}[\tilde{U}_N]|\psi_{N-1}\rangle - Q_N \mathbb{E}\tilde{U}_N]|\psi_{N-1}\rangle = 0$, $$(\tilde{Q} - \mathbb{E}[\tilde{Q}])|\psi\rangle = \underbrace{Q_N(\tilde{U}_N - \mathbb{E}[\tilde{U}_N])|\psi_{N-1}\rangle}_{y} + \underbrace{Q_N \mathbb{E}[\tilde{U}_N](|\psi_{N-1}\rangle - \mathbb{E}[|\psi_{N-1}\rangle])}_{x}. \quad (51)$$

Observe that conditioning on x sets the value of $|\psi_{N-1}\rangle$ but not $\tilde{U}_N$. Hence $\mathbb{E}[Q_N(\tilde{U}_N - \mathbb{E}[\tilde{U}_N])|\psi_{N-1}\rangle | x] = Q_N \mathbb{E}[(\tilde{U}_N - \mathbb{E}[\tilde{U}_N])]|\psi_{N-1}\rangle = 0$. and one may apply inequality on $\mathbb{E}[\|x+y\|^q]^{2/q}$ to obtain $$\mathbb{E}[\||\psi_N\rangle - \mathbb{E}[|\psi_N\rangle]\|^q]^{2/q} = \mathbb{E}[\|(\tilde{Q} - \mathbb{E}[\tilde{Q}])|\psi\rangle\|^q]^{2/q} = \mathbb{E}[\|x+y\|^q]^{2/q} \quad (52)$$

$$\leq \mathbb{E}[\|\mathbb{E}[\tilde{U}_N](|\psi_{N-1}\rangle - \mathbb{E}[|\psi_{N-1}\rangle])\|^q]^{2/q} + \quad (53)$$

$$(q-1)\mathbb{E}[\|(\tilde{U}_N - \mathbb{E}[\tilde{U}_N])|\psi_{N-1}\rangle\|^q]^{2/q} \quad (54)$$

$$\leq \mathbb{E}[\|(|\psi_{N-1}\rangle - \mathbb{E}[|\psi_{N-1}\rangle])\|^q]^{2/q} + \quad (55)$$

$$(q-1)\mathbb{E}[\|(\tilde{U}_N - \mathbb{E}[\tilde{U}_N])\|^q]^{2/q}$$

$$\leq (q-1)\sum_{l=1}^N \mathbb{E}[\|(\tilde{U}_l - \mathbb{E}[\tilde{U}_l])\|^q]^{2/q} \quad (56)$$

By substituting $$\|(\tilde{U}_l - \mathbb{E}[\tilde{U}_l])\| \leq \frac{\pi}{2^{-b+1}}$$

one obtains $$\mathbb{E}[\|(\tilde{Q} - \mathbb{E}[\tilde{Q}])|\psi\rangle\|^q]^{1/q} \leq 2\pi \sqrt{\frac{(q-1)N}{2^{2b}}}. \quad (57)$$

5.1. Tail Bounds on Approximation Error

The bounds on systematic and random errors may now be combined.

$$\mathbb{E}[\|(\tilde{Q} - Q)|\psi\rangle\|^q] \leq 2^q \max\{\|(\mathbb{E}[\tilde{Q}] - Q)|\psi\rangle\|^q, \mathbb{E}[\|(\tilde{Q} - \mathbb{E}[Q])|\psi\rangle\|^q]\} \quad (58)$$

$$\leq 2^q \max\left\{\left(\frac{\pi^2}{2} \frac{N}{2^{2b}}\right)^q, \left(2\pi\sqrt{\frac{(q-1)N}{2^{2b}}}\right)^q\right\} \quad (59)$$

$$\leq \left(4\pi\sqrt{\frac{(q-1)N}{2^{2b}}}\right)^q \leq \left(\frac{4\pi}{2^b}\sqrt{qN}\right)^q. \quad (60)$$

Using Lyapunov's inequality, $\mathbb{E}[|X|^q]^{1/q} \leq \mathbb{E}[|X|^s]^{1/s}$ for $0 < q < s < \infty$. Hence the expected error $$\bar{\epsilon} = \max_{|\psi\rangle} \mathbb{E}[\|(\tilde{Q} - Q)|\psi\rangle\|] \leq \max_{|\psi\rangle} \mathbb{E}[\|(\tilde{Q} - Q)|\psi\rangle\|^2]^{1/2} \leq \frac{4\pi}{2^b}\sqrt{N}. \quad (61)$$

$$b \geq \log_2\left(\frac{4\pi\sqrt{N}}{\bar{\epsilon}}\right) \approx 3.65 + \log_2\left(\frac{\sqrt{N}}{\bar{\epsilon}}\right) \quad (62)$$

Substituting into Markov's inequality, $$Pr[\|(\tilde{Q} - Q)|\psi\rangle\| \geq \epsilon] \leq \frac{\mathbb{E}[\|(\tilde{Q} - Q)|\psi\rangle\|^q]}{\epsilon^q} \quad (63)$$

$$\leq \left(\frac{4\pi}{\epsilon 2^b}\sqrt{qN}\right)^q \quad (64)$$

$$= \exp\left(q\left(\frac{1}{2}\ln(q) + \ln\left(\frac{4\pi}{\epsilon 2^b}\sqrt{N}\right)\right)\right) \quad (65)$$

$$= \exp\left(q\left(\frac{1}{2}\ln(q) + \ln(z)\right)\right) \quad (66)$$

The exponent is minimized by choosing $$q = \frac{1}{ez^2} = \frac{\epsilon^2 2^{2b}}{16 e \pi^2 N}.$$

Hence $$p = Pr[\|(\tilde{Q} - Q)|\psi\rangle\| \geq \epsilon] \leq \exp(q(\ln(\sqrt{c}))) = \exp\left(-\frac{\epsilon^2 2^{2b}}{32 e \pi^2 N}\right) \quad (67)$$

The bits of precision required is then $$b \geq \frac{1}{2}\log_2\left(32 e \pi^2 \log\left(\frac{1}{p}\right)\right) + \log_2\left(\frac{\sqrt{N}}{\epsilon}\right) \quad (68)$$

$$\geq 4.88 + \log_2\left(\log\left(\frac{1}{p}\right)\right) + \log_2\left(\frac{\sqrt{N}}{\epsilon}\right) \quad (69)$$

6. Quantum Phase Estimation on Electronic Structure

Described in this section are potential improvements that the disclosed compilation offers in some specific examples. A generic quantum phase estimation problem estimates the eigenphase of a given unitary $W|\lambda_j\rangle = e^{i\phi_j}|\lambda_j\rangle$. The index j of the eigenphase is sampled with probability $p_j = |\langle \lambda_j | \psi_{trial}\rangle|^2$, and $\phi_j$ is estimated to a chosen error $\delta$ with high probability. Within the algorithm, the most expensive component is the sequence of the controlled-W applied $M = \mathcal{O}(1/\delta)$ times. More precisely, a sequence of controlled unitaries W, $W^2$, $W^4$, . . . is applied where the $k^{th}$ sequence is controlled by the $k^{th}$ qubit. For present purposes, it suffices to know that this sequence contains some number M applications of the multiplexed unitary $U_j$ that may be compiled using the methods herein.

In one example application on estimating the energy levels of a catalyst for carbon fixation [Ref. 6], $$M = \frac{8(N-1)\pi\alpha_{DF}}{\Delta_E},$$

the bits of precision required is claimed to be $$b = 5.652 + \log_2\left(\frac{N\alpha_{DF}}{0.1\Delta_E}\right).$$

and the maximum number of qubits storing these bits is ~Nb. For a typical problem of scientific interest, $N\sim10^2$, $\alpha_{DF}\sim10^3$, $\Delta_E\sim10^{-3}$. Hence b~36 and Nb~3600.

The randomized compilation scheme may now be applied. In the diamond distance, $\epsilon$ bounds the error of the overall sequence of controlled W and should be chosen to be comparable to $p_j$ for the eigenstate of interest. $p_j$ depends very much on the specific electronic structure problem studied, but one may hope for $p_j\sim0.1$. Hence $$b \approx 1.152 + \frac{1}{2}\log_2\left(\frac{8(N-1)\pi\alpha_{DF}}{\Delta_E}\right) + \frac{1}{2}\log_2\left(\frac{1}{\epsilon}\right) \sim 19, \text{Nb} \sim 1900. \quad (70)$$

In the case of a single instance of randomized compilation, $$b \approx 3.65 + \frac{1}{2}\log_2\left(\frac{8(N-1)\pi\alpha_{DF}}{\Delta_E}\right) + \log_2\left(\frac{1}{\epsilon}\right) \sim 22, \text{Nb} \sim 2200. \quad (71)$$

Similar results also apply to applications using the same primitives, such as the quantum simulation of electronic structure in the tensor hypercontraction representation [Ref. 7].

7. Classical- and Quantum-Computation Methods

The principles hereinabove can be implemented in various quantum-computing scenarios. In one example scenario, a developer or team of developers may develop quantum-computer code targeting a particular task or problem. The quantum-computer code may be composed in a relatively high-level quantum-computer language—e.g., an implementation-agnostic language—and may include complex, many-qubit operations, such as one or more multiplexed-rotation gates. It may be desirable to execute the quantum-computer code on a fault-tolerant quantum computer or in a fault-tolerant manner.

Figure 6:
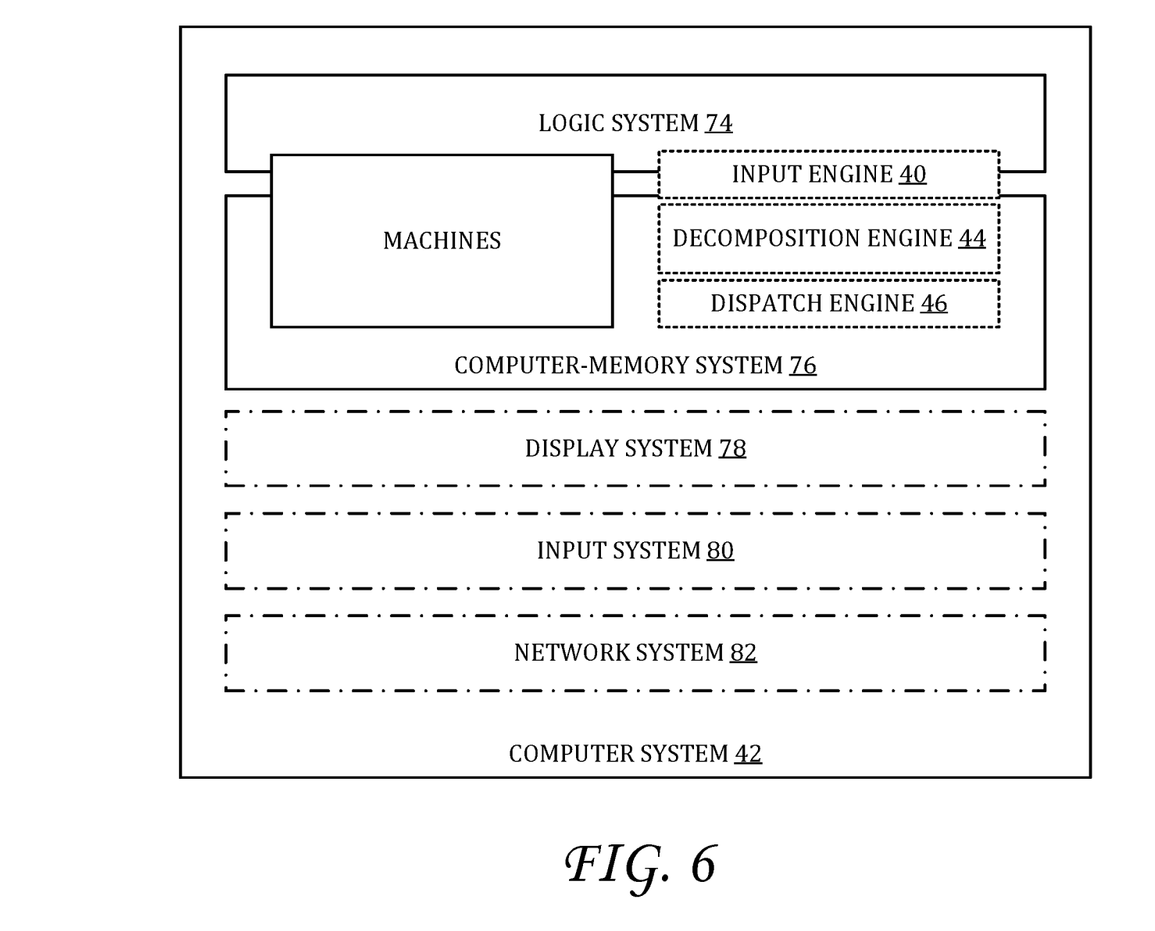
FIG. 6 shows aspects of an example classical computer system.

To that end, and referring briefly to FIG. 6, the quantum-computer code may be received in a suitably configured input engine 40 of a classical computer 42. The input engine is coupled operatively to decomposition engine 44 and dispatch engine 46. The decomposition engine is configured to convert (i.e., to 'decompose' or 'compile') the quantum-computer code into a sequence of one- or two-qubit instructions—e.g., quantum gates—as described herein. The sequence of instructions may take the form of a directed acyclic graph (DAG), G=(V,E), where each of a set of vertices V corresponds to a quantum-gate operation, and where an edge (v,w)∈E joins vertices v and w if the computation at v depends on the result of the computation at w. As a simple example, in order to compute the length of the hypotenuse of a right triangle with sides of length a and b, the computation $\sqrt{a^2+b^2}$ is formulated as a graph with four vertices, which represent the two squaring operations, the addition operation, and the square-root operation. Via dispatch engine 46, the sequence of instructions is dispatched to a communicatively coupled quantum computer.

As noted in Section 1, the low-level instructions assembled by decomposition engine 44 may comprise matrix multiplications (e.g., rotations of the state vector), which are effected by sending predefined signals into the state register from classical interface hardware. The signals may also trigger a measurement, where return signal is received back into the interface hardware from the state register. In some examples, the decomposition engine is configured to select each of the low-level operations from a predefined set consisting of operations and/or measurement. The result of a given measurement may affect which portions of the DAG are subsequently executed.

Figure 4:
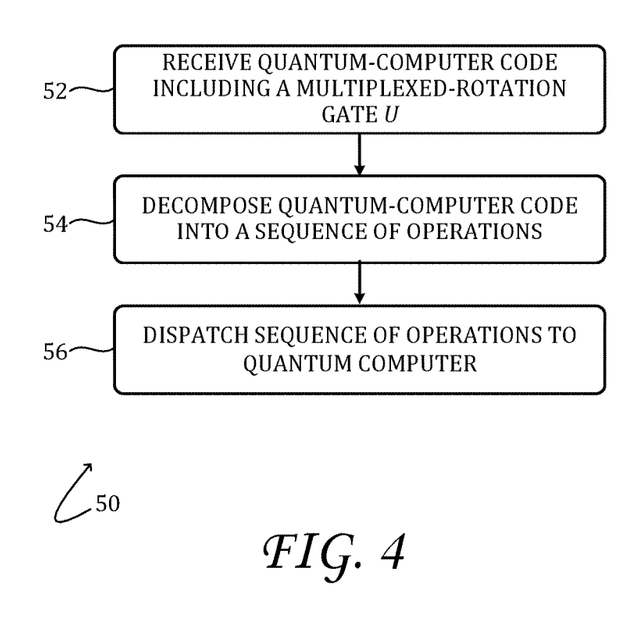
FIG. 4 shows aspects of an example classical-computation method.

In view of the above context, FIG. 4 shows aspects of an example classical-computation method 50. Enacted in a classical computer, method 50 provides a sequence of instructions to an operatively coupled quantum computer. The classical computer supporting method 50 may include input, decomposition, and dispatch engines as noted above. Selected aspects of a classical computer compatible with method 50 are described hereinafter, with reference to FIG. 6.

In classical-computation method 50, the classical computer receives quantum-computer code including one or more multiplexed-rotation gates. For each multiplexed-rotation gate U that appears in the code, the classical computer emits a sequence of instructions that approximate U to a required precision $\epsilon$. Executing the approximation requires storage of intermediate quantum states in a number of ancillary qubits; one objective of method 50 is to minimize the required number of ancillary qubits for a given value of $\epsilon$.

Broadly speaking, each multiplexed-rotation gate U instructs rotation of the state vector by K arbitrary rotation angles $\theta_k$ (in eq 6). Each arbitrary rotation angle is approximated as a sum of fixed rotation angles with coefficients 1 or 0 as defined in a bit string. Each fixed rotation in the approximation may be enacted in succession via elementary rotation gates applied to the state vector, thereby approximating the arbitrary rotation to the required precision. That process is repeated for each of the K rotations in multiplexed-rotation gate U. The classical computer, by controlling the decomposition, controls the number of bits in the approximation and the manner in which the bits are selected.

Turning now to FIG. 4, at 52 of method 50 the input engine of the classical computer receives quantum-computer code defining a physical transformation of a state register of the quantum computer. As noted hereinabove, the state register holds a state vector in a series of qubits. The quantum-computer code received at 52 may include as may any intermediate stage of the decomposition—a multiplexed-rotation gate U to be applied to the state vector, as defined in eq 6. In some examples, one or more multiplexed-rotation gates may occur as a product in a multiplexed-rotation circuit V involving additional unitaries, as defined in eq 7.

At 54 of method 50, a decomposition engine of the classical computer decomposes the quantum-computer code into a sequence of instructions. In some examples, the instructions in the sequence may be limited to the universal gate set {H, S, C$_{NOT}$, T}. In some examples, the sequence of instructions may be configured as part of a graph, such as a DAG. In general, the sequence of instructions may be configured to direct the quantum computer to execute a quantum-computation method 60 for enacting at least one multiplexed-rotation gate U, as described hereinafter with reference to FIG. 5. At 56 of method 50 a dispatch engine of the classical computer dispatches the sequence of instructions to the quantum computer.

Figure 5:
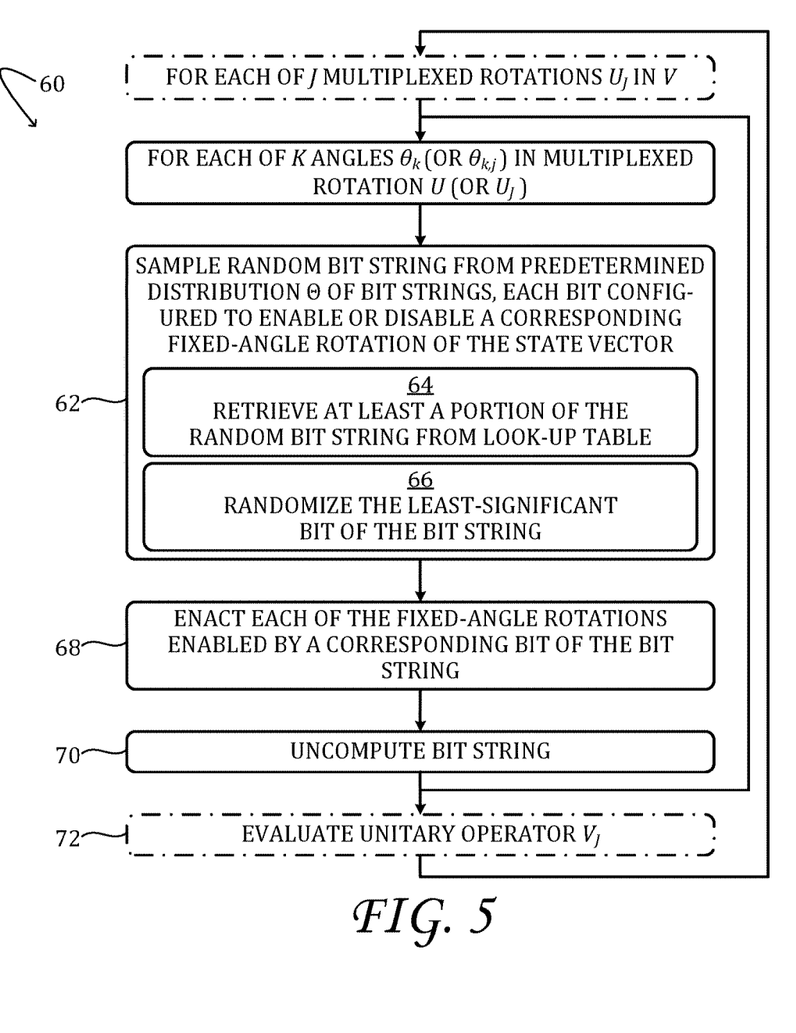
FIG. 5 shows aspects of an example quantum-computation method.

FIG. 5 shows aspects of an example quantum-computation method 60 for applying at least one multiplexed-rotation gate U to the state vector of a quantum computer. Method 60 physically transforms the state register, which holds the state vector in a first series of qubits.

At 62 of method 60 the quantum computer samples a random bit string from a predetermined distribution of bit strings. Each bit of the random bit string is configured to enable or disable a corresponding fixed-angle rotation of the state vector, such that a product of the enabled fixed-angle rotations approximates an arbitrary rotation of the state vector through an angle $\theta_k$ of multiplexed-rotation gate U.

The term 'sampling a random bit string from a predetermined distribution of bit strings' should be interpreted broadly; it requires that a bit string is retrieved from qubit memory but does not require the bit string to be drawn from a pre-loaded pool of bit strings.

Neither is that implementation excluded, however. The process of sampling the random bit string is such that, if infinitely many bit strings were sampled by that same process, the accumulation of bit strings sampled would conform to the predetermined distribution noted above. The term 'random bit string' is used to convey the idea that the bit string, taken as a whole, is a random variable. It does not require each and every bit of the bit string to be a random variable. Generally speaking, a 'random bit string' need only include one random bit; the other bits may be predetermined or determined algorithmically.

In some examples, the act of sampling the random bit string comprises, at 64 of method 60, retrieving at least a portion of the random bit string from a lookup table of the quantum computer. The lookup table may be any quantum circuit (e.g., oracle) that computes the desired bit strings. The retrieved portion of the random bit string may then be stored in an ancillary register of the quantum computer. For an arbitrary rotation angle $\theta_k$ the particular bit string retrieved is based on the value of $|k\rangle$. That aspect is introduced in connection to the (K,b) table-lookup oracle on page 10. In some examples, the act of sampling the random bit string comprises, at 66, randomizing a least-significant bit of the bit string. That aspect is introduced in connection to the random b-bit fraction on page 10.

At 68 of method 60 the quantum computer enacts on the state vector each of the fixed-angle rotations enabled by a corresponding bit of the bit string—i.e., where the corresponding bit is equal to 1. The fixed-angle rotations disabled by a corresponding bit of the bit string—i.e., where the corresponding bit is equal to 0—are not enacted. This operation may be referred to as a 'controlled rotation gate'. It will be noted that more efficient algorithms for applying the plural rotations, relative to successive application, may also be used. That aspect is introduced in connection to the integer-controlled single-qubit rotation on page 9. Generally speaking, repeated sampling of the random bit string, at 62, and enacting each of the enabled fixed angle rotations, at 68, results in an average error between the arbitrary rotation $\theta_k$ and the product of the enabled fixed-angle rotations. In some examples, the predetermined distribution of bit strings hereinabove is such as to cause the average error (i.e., the accumulated error per rotation) to decrease with the repeated sampling and enacting.

At 70 of method 60 the quantum computer executes an uncompute table-lookup operation. The uncompute table-lookup operation restores the ancilla register holding the bit string to its pre-lookup state, typically a bit-string of all zeroes ($|0 \ldots 0\rangle$). The uncompute operation allows the ancillary register to be reused in other parts of the quantum computer, if necessary, and prevents the measured output from depending on details of how an algorithm was implemented. That aspect is introduced in connection to the implementation of U on page 10.

Method 60 includes an inner control loop that iterates through each of the K angles that define the multiplexed-rotation gate U. Accordingly, method 60 may further comprise likewise sampling a random bit string and likewise enacting a fixed-angle rotation of the state vector for each of the plurality K of angles $\theta_k$ that define multiplexed-rotation gate U.

In some examples, a plurality of multiplexed-rotation gates $U_j$ may occur as a product in the quantum-computer code, optionally combined each with a corresponding unitary operator $V_j$. Such products may correspond to a multiplexed-rotation circuit V as described in hereinabove in connection to eq 7. Accordingly, the inner control loop of method 60 may be nested, optionally, within an outer control loop that iterates through each of J multiplexed-rotation gates that define a multiplexed-rotation circuit V. In implementations that support this variant, method 60 may further comprise likewise sampling a random bit string and likewise enacting a fixed-angle rotation of the state vector for each of K×J angles $\theta_{k,j}$, where multiplexed-rotation gate $U_j$ is one of a product of J multiplexed-rotation gates. That aspect is introduced in connection to the implementation of the V on page 10. In examples in which method 60 is applied to compute a multiplexed-rotation circuit V, the method may further include, at 72, evaluating the unitary operator $V_j$ corresponding to each of the J multiplexed-rotation gates.

A relevant feature of this disclosure is the sampling of the bit string at 62. The bit string is not determined by a fixed algorithm, which would yield the same systematic error each time a given angle $\theta_k$ is approximated. Rather, the bit string is sampled from a distribution that reduces the average error asymptotically to zero after infinitely many approximations of the angle. Effectively, this means that a given level of accuracy can be achieved using a bit string that is shorter than any bit string deterministically computed to provide the same level of accuracy. The ability to use shorter bit strings directly reduces the ancilla qubit requirement for multiplexed-rotation gates, and without increasing the T-gate requirement.

For additional context, the interested reader is referred to the following references, which are hereby incorporated by reference herein, for all purposes.

[Ref. 1] Craig Gidney. Halving the cost of quantum addition. *Quantum*, 2, 74, 2018.

[Ref. 2] Guang Hao Low, Vadym Kliuchnikov, and Luke Schaeffer. Trading T-gates for dirty qubits in state preparation and unitary synthesis. *arXiv preprint*, arXiv: 1812.00954, 2018.

[Ref. 3] Andrew M. Childs. On the relationship between continuous- and discrete-time quantum walk. *Communications in Mathematical Physics*, 294 (2) 581-603, 2010.

[Ref. 4] Vadym Kliuchnikov, Dmitri Maslov, and Michele Mosca. Fast and Efficient Exact Synthesis of Single-Qubit Unitaries Generated by Clifford and T Gates. *Quantum Info. Comput.*, 13 (7-8) 607-630, 2013.

[Ref. 5] V. V. Shende, S. S. Bullock, and I. L. Markov. Synthesis of quantum-logic circuits. IEEE Transactions on *Computer-Aided Design of Integrated Circuits and Systems*, 25 (6) 1000-1010, 2006.

[Ref. 6] Vera von Burg, Guang Hao Low, Thomas Hiner, Damian S. Steiger, Markus Reiher, Martin Roetteler, and Matthias Troyer. Quantum computing enhanced computational catalysis. *arxiv preprint*, arXiv:2007.14460, 2020.

[Ref. 7] Joonho Lee, Dominic W. Berry, Craig Gidney, William J. Huggins, Jarrod R. McClean, Nathan Wiebe, and Ryan Babbush. Even more efficient quantum computations of chemistry through tensor hypercontraction. *arxziv preprint*, arXiv:2011.03494, 2020.

[Ref. 8] Guang Hao Low and Isaac L. Chuang. Hamiltonian simulation by qubitization. *Quantum*, 3, 163, 2019.

[Ref. 9] Earl Campbell. Shorter gate sequences for quantum computing by mixing unitaries. *Physical Review A*, 95 (4) 042306, 2017.

[Ref. 10] Chi-Fang Chen, Hsin-Yuan Huang, Richard Kueng, and Joel A. Tropp. Quantum simulation via randomized product formulas: Low gate complexity with accuracy guarantees. *arXiv preprint*, arXiv:2008.11751, 2020.

[Ref. 11] Andrew M. Childs, Dmitri Maslov, Yunseong Nam, Neil J. Ross, and Yuan Su. Toward the first quantum simulation with quantum speedup. *Proceedings of the National Academy of Sciences*, 115 (38) 9456-9461.

8. Classical Computer System and Additional Description

The methods herein may be tied to a computer system of one or more computing devices. Such methods and processes may be implemented as an application program or service, an application programming interface (API), a library, and/or other computer-program product.

FIG. 6 provides a schematic representation of a classical computer 42 configured to provide some or all of the classical computer system functionality disclosed herein. Classical computer 42 may take the form of a personal computer, application-server computer, or any other computing device.

Classical computer 42 includes a logic system 74 and a computer-memory system 76. Classical computer 42 may optionally include a display system 78, an input system 80, a network system 82, and/or other systems not shown in the drawings.

Logic system 74 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 76 includes at least one physical device configured to temporarily and/or permanently hold computer system information, such as data and instructions executable by logic system 74. When the computer-memory system includes two or more devices, the devices may be collocated or remotely located. Computer-memory system 76 may include at least one volatile, nonvolatile, dynamic, static, read/write, read-only, random-access, sequential-access, location-addressable, file-addressable, and/or content-addressable computer-memory device. Computer-memory system 76 may include at least one removable and/or built-in computer-memory device. When the logic system executes instructions, the state of computer-memory system 76 may be transformed e.g., to hold different data.

Aspects of logic system 74 and computer-memory system 76 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 74 and computer-memory system 76 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 78 may be used to present a visual representation of data held by computer-memory system 76. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 80 may comprise or interface with one or more input devices. An input device may include a sensor device or a user input device. Examples of user input devices include a keyboard, mouse, or touch screen.

When included, network system 82 may be configured to communicatively couple classical computer 42 with one or more other computer systems. The network system may include wired and/or wireless communication devices compatible with one or more different communication protocols. The network system may be configured for communication via personal-, local- and/or wide-area networks.

One aspect of this disclosure is directed to a quantum-computation method for physically transforming a state register of a quantum computer, the state register holding a state vector in a series of qubits. The method comprises sampling a random bit string from a predetermined distribution of bit strings, where each bit of the random bit string enables or disables a corresponding fixed-angle rotation of the state vector, such that a product of the enabled fixed-angle rotations approximates an arbitrary rotation of the state vector through an angle $\theta_k$ of a multiplexed-rotation gate U. The method further comprises enacting on the state vector each of the fixed-angle rotations enabled by a corresponding bit of the bit string.

In some implementations, repeated sampling of the random bit string and enacting each of the enabled fixed angle rotations results in an average error between the arbitrary rotation and the product of the enabled fixed-angle rotations, and the predetermined distribution is configured so as to cause the average error to decrease with the repeated sampling and enacting. In some implementations, sampling the random bit string comprises retrieving the random bit string from a lookup table of the quantum computer. In some implementations, sampling the random bit string further comprises randomizing a least-significant bit of the bit string. In some implementations, the angle $\theta_k$ is one of a plurality K of angles defining the multiplexed-rotation gate U, the method further comprising likewise sampling a random bit string and enacting a fixed-angle rotation of the state vector for each of the plurality K of angles. In some implementations, the multiplexed-rotation gate U is one of a product of J multiplexed-rotation gates, the method further comprising likewise sampling a random bit string and enacting a fixed-angle rotation of the state vector for each of K×J angles $\theta_{k,j}$. In some implementations, the method further comprises evaluating a unitary operator V for each of the J multiplexed-rotation gates.

Another aspect of this disclosure is directed to a quantum computer comprising a state register, an ancillary register, a qubit reader, and a qubit writer. The state register is configured to hold a state vector in a first series of qubits. The qubit reader is configured to sample a random bit string from a predetermined distribution of bit strings, where each bit of the random bit string enables or disables a corresponding fixed-angle rotation of the state vector, such that a product of the enabled fixed-angle rotations approximates an arbitrary rotation of the state vector through an angle $\theta_k$ of a multiplexed-rotation gate U. The ancillary register is configured to hold the random bit string in a second series of qubits, and the qubit writer is configured to transform the state register to enact on the state vector each of the fixed-angle rotations enabled by a corresponding bit of the random bit string.

In some implementations, the qubit reader, in sampling the random bit string, is further configured to retrieve the random bit string from a lookup table of the quantum computer. In some implementations, the quantum computer further comprises a controller holding instructions that direct the quantum computer to randomize a least-significant bit of the bit string. In some implementations, the angle $\theta_k$ is one of a plurality K of angles defining the multiplexed-rotation gate U, and the qubit reader is further configured to likewise sample a random bit string and the qubit writer is further configured to enact a fixed-angle rotation of the state vector, for each of the plurality K of angles. In some implementations, the multiplexed-rotation gate U is one of a product of J multiplexed-rotation gates, and the qubit reader is further configured to likewise sample a random bit string and the qubit writer is further configured to enact a fixed-angle rotation of the state vector, for each of K×J angles $\theta_{k,j}$. In some implementations, the quantum computer further comprises a controller holding instructions that direct the quantum computer to evaluate a unitary operator $V_j$ for each of the J multiplexed-rotation gates.

Another aspect of this disclosure is directed to a classical-computation method enacted in a classical computer, for providing a sequence of instructions to a quantum computer. The method comprises receiving quantum-computer code defining a physical transformation of a state register of a quantum computer, the state register holding a state vector in a series of qubits, and the quantum-computer code including a multiplexed-rotation gate U to be applied to the state vector. The method further comprises decomposing the quantum-computer code into a sequence of instructions directing the quantum computer to: (a) sample a random bit string from a predetermined distribution of bit strings, where each bit of the random bit string enables or disables a corresponding fixed-angle rotation of the state vector, such that a product of the enabled fixed-angle rotations approximates an arbitrary rotation of the state vector through an angle $\theta_k$ of the multiplexed-rotation gate; and (b) enact on the state vector each of the fixed-angle rotations enabled by a corresponding bit of the bit string. The method further comprises dispatching the sequence of instructions to the quantum computer.

In some implementations, repeated sampling of the random bit string and enacting each of the enabled fixed angle rotations results in an average error between the arbitrary rotation and the product of the enabled fixed-angle rotations, and the predetermined distribution is configured so as to cause the average error to decrease with the repeated sampling and enacting. In some implementations, sampling the random bit string comprises retrieving the random bit string from a lookup table of the quantum computer. In some implementations, sampling the random bit string further comprises randomizing a least-significant bit of the bit string. In some implementations, the angle $\theta_k$ is one of a plurality K of angles defining the multiplexed-rotation gate U, and the sequence of instructions directs the quantum computer to likewise sample a random bit string and enact a fixed-angle rotation of the state vector for each of the plurality K of angles. In some implementations, the multiplexed-rotation gate U is one of a product of J multiplexed-rotation gates, and the sequence of instructions directs the quantum computer to likewise sample a random bit string and enact a fixed-angle rotation of the state vector for each of K×J angles $\theta_{k,j}$. In some implementations, the sequence of instructions further directs the quantum computer to evaluate a unitary operator $V_j$ for each of the J multiplexed-rotation gates.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A quantum-computation method for physically transforming a state qubit register of a quantum computer, the state qubit register holding a state vector in a series of physical qubits, the method comprising:
   sampling a bit string from a predetermined distribution of bit strings, wherein sampling the bit string comprises retrieving the bit string from a lookup table of the quantum computer and randomizing a least-significant bit of the bit string to generate a random bit string; and
   enacting on the state vector each of the fixed-angle rotations enabled by a corresponding bit of the random bit string, wherein each bit of the random bit string enables or disables a corresponding fixed-angle rotation of the state vector, such that a product of the enabled fixed-angle rotations approximates an arbitrary rotation of the state vector through an angle $\theta_k$ of a multiplexed-rotation gate U.

2. The method of claim 1 wherein repeated sampling and randomizing of the bit string and enacting each of the enabled fixed-angle rotations results in an average error between the arbitrary rotation and the product of the enabled fixed-angle rotations, and wherein the predetermined distribution is configured so as to cause the average error to decrease with the repeated sampling and enacting.

3. The method of claim 1 wherein the angle $\theta_k$ is one of a plurality K of angles defining the multiplexed-rotation gate U, the method further comprising likewise sampling and randomizing a bit string and enacting a fixed-angle rotation of the state vector for each of the plurality K of angles.

4. The method of claim 3 wherein the multiplexed-rotation gate U is one of a product of J multiplexed-rotation gates, the method further comprising likewise sampling and randomizing a bit string and enacting a fixed-angle rotation of the state vector for each of K×J angles $\theta_{k,j}$.

5. The method of claim 4 further comprising evaluating a unitary operator $V_j$ for each of the J multiplexed-rotation gates.

6. A quantum computer comprising:
   a state qubit register configured to hold a state vector in a first series of physical qubits;
   a qubit reader configured to sample a bit string from a predetermined distribution of bit strings, wherein sampling the bit string comprises retrieving the bit string from a lookup table of the quantum computer;
   a controller holding instructions that randomize a least-significant bit of the bit string, to generate a random bit string, wherein each bit of the random bit string enables or disables a corresponding fixed-angle rotation of the state vector, such that a product of the enabled fixed-angle rotations approximates an arbitrary rotation of the state vector through an angle $\theta_k$ of a multiplexed-rotation gate U;
   an ancillary qubit register configured to hold the random bit string in a second series of physical qubits; and
   a qubit writer configured to transform the state qubit register to enact on the state vector each of the fixed-angle rotations enabled by a corresponding bit of the random bit string.

7. The quantum computer of claim 6 wherein the angle $\theta_k$ is one of a plurality K of angles defining the multiplexed-rotation gate U, and wherein the qubit reader is further configured to likewise sample and randomize a bit string and the qubit writer is further configured to enact a fixed-angle rotation of the state vector, for each of the plurality K of angles.

8. The quantum computer of claim 7 wherein the multiplexed-rotation gate U is one of a product of J multiplexed-rotation gates, and wherein the qubit reader is further configured to likewise sample and randomize a bit string and the qubit writer is further configured to enact a fixed-angle rotation of the state vector, for each of K×J angles $\theta_{k,j}$.

9. The quantum computer of claim 8 wherein the controller holds instructions that direct the quantum computer to evaluate a unitary operator $V_j$ for each of the J multiplexed-rotation gates.

10. Enacted in a classical computer, a classical-computation method for providing a sequence of instructions to a quantum computer, the method comprising:
   receiving quantum-computer code defining a physical transformation of a state qubit register of a quantum computer, the state qubit register holding a state vector in a series of physical qubits, the quantum-computer code including a multiplexed-rotation gate U to be applied to the state vector;
   decomposing the quantum-computer code into a sequence of instructions directing the quantum computer to:
      sample a bit string from a predetermined distribution of bit strings, wherein sampling the bit string comprises retrieving the bit string from a lookup table of the quantum computer and randomizing a least-significant bit of the bit string to generate a random bit string;
      enact on the state vector each of the fixed-angle rotations enabled by a corresponding bit of the bit string, wherein each bit of the random bit string enables or disables a corresponding fixed-angle rotation of the state vector, such that a product of the enabled fixed-angle rotations approximates an arbitrary rotation of the state vector through an angle $\theta_k$ of the multiplexed-rotation gate U; and dispatching the sequence of instructions to the quantum computer.

11. The method of claim 10 wherein repeated sampling and randomizing of the bit string and enacting each of the enabled fixed-angle rotations results in an average error between the arbitrary rotation and the product of the enabled fixed-angle rotations, and wherein the predetermined distribution is configured so as to cause the average error to decrease with the repeated sampling, randomizing, and enacting.

12. The method of claim 10 wherein the angle $\theta_k$ is one of a plurality K of angles defining the multiplexed-rotation gate U, and wherein the sequence of instructions directs the quantum computer to likewise sample and randomize bit string and enact a fixed-angle rotation of the state vector for each of the plurality K of angles.

13. The method of claim 12 wherein the multiplexed-rotation gate U is one of a product of J multiplexed-rotation gates, and wherein the sequence of instructions directs the quantum computer to likewise sample and randomize a bit string and enact a fixed-angle rotation of the state vector for each of K×J angles $\theta_{k,j}$.

14. The method of claim 13 wherein the sequence of instructions further directs the quantum computer to evaluate a unitary operator $V_j$ for each of the J multiplexed-rotation gates.

* * * * *